Aug. 4, 1970  E. J. CRANE  3,522,622
HOCK CUTTER

Filed Sept. 22, 1967  5 Sheets-Sheet 1

INVENTOR.
EDWARD J. CRANE
BY
ATTORNEYS

Aug. 4, 1970   E. J. CRANE   3,522,622
HOCK CUTTER
Filed Sept. 22, 1967   5 Sheets-Sheet 2
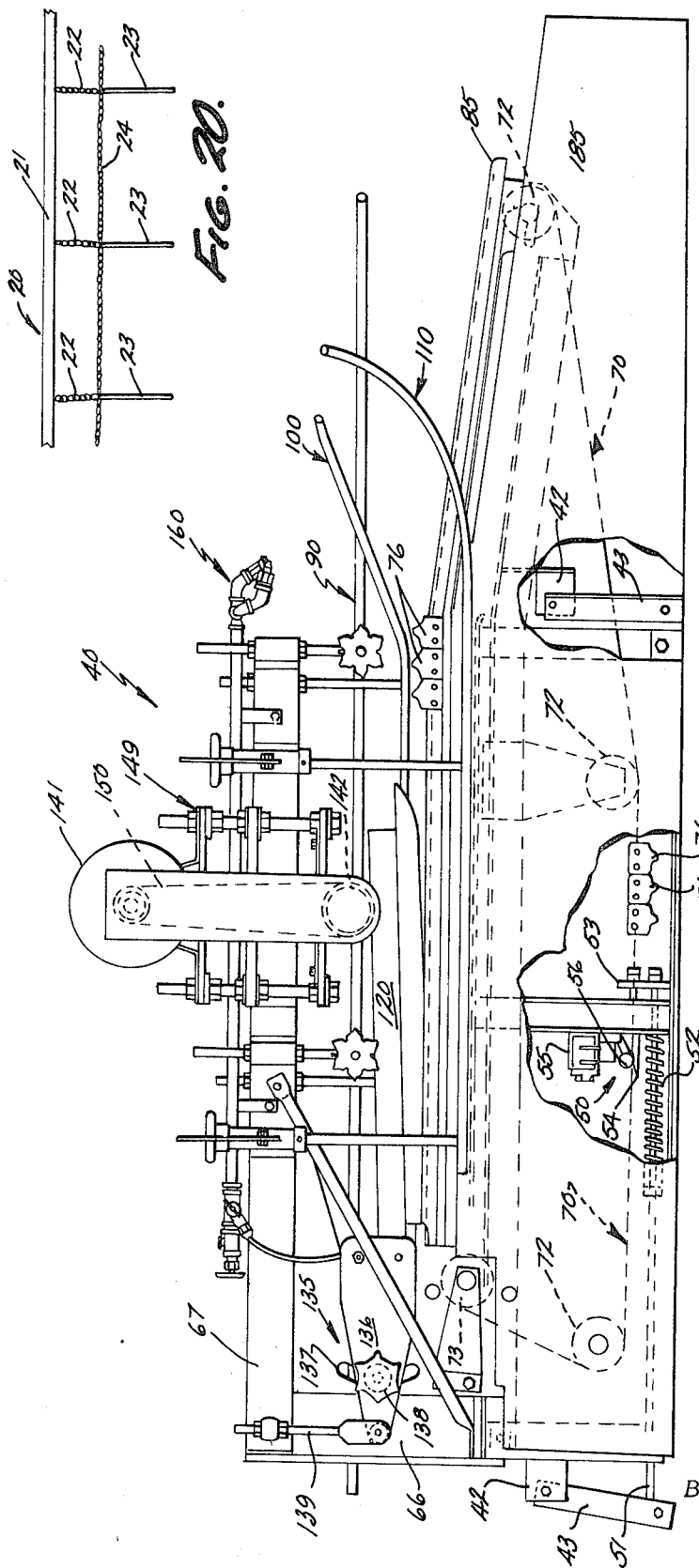
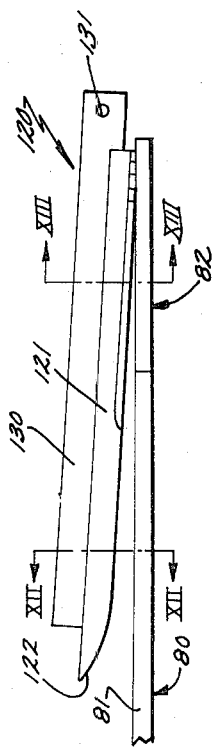
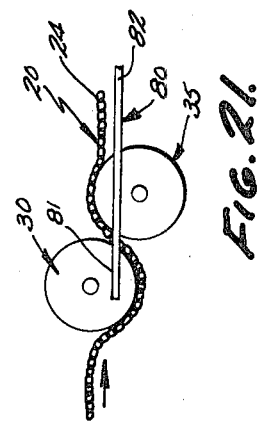
INVENTOR.
EDWARD J. CRANE
BY
ATTORNEYS

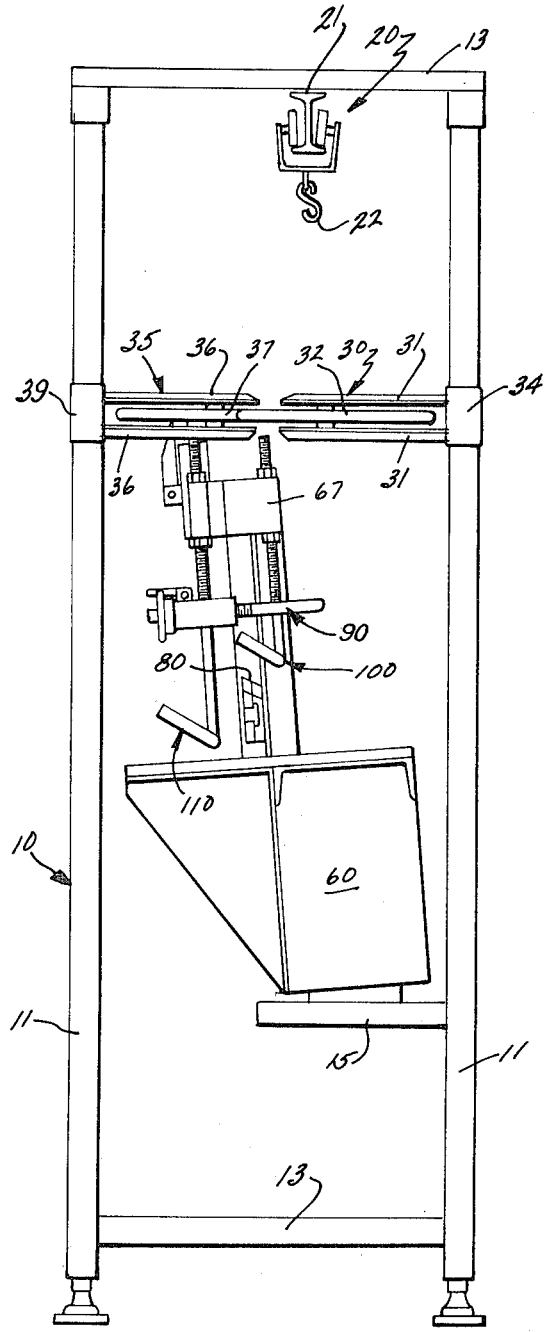
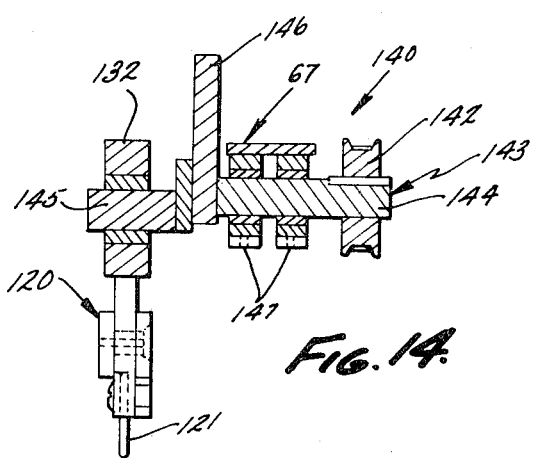
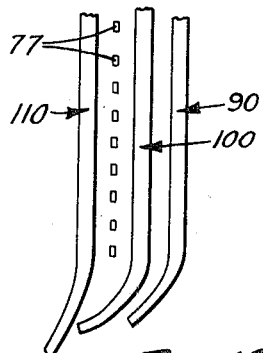
FIG. 3.
FIG. 14.
FIG. 19.
INVENTOR.
EDWARD J. CRANE
BY
ATTORNEYS

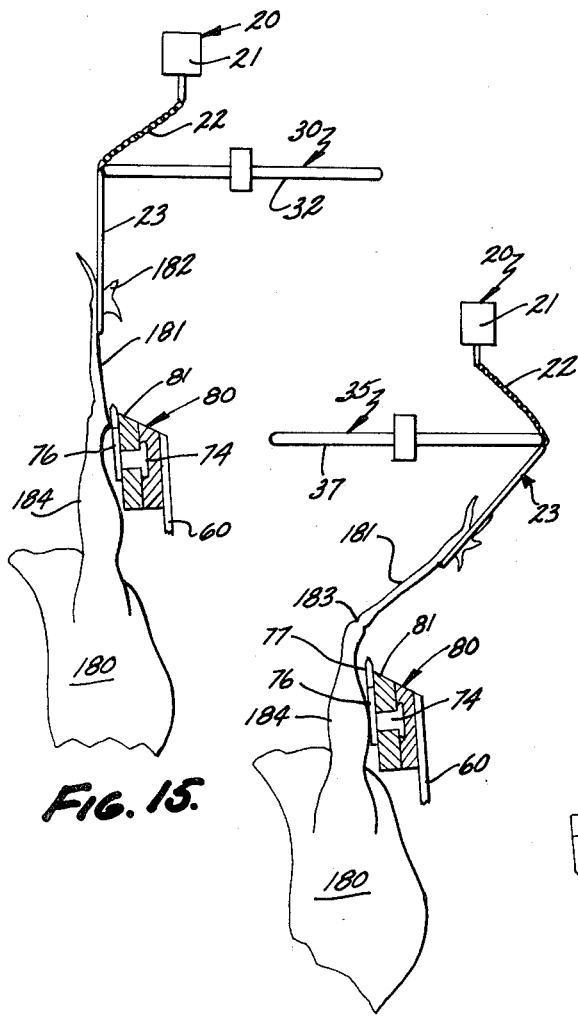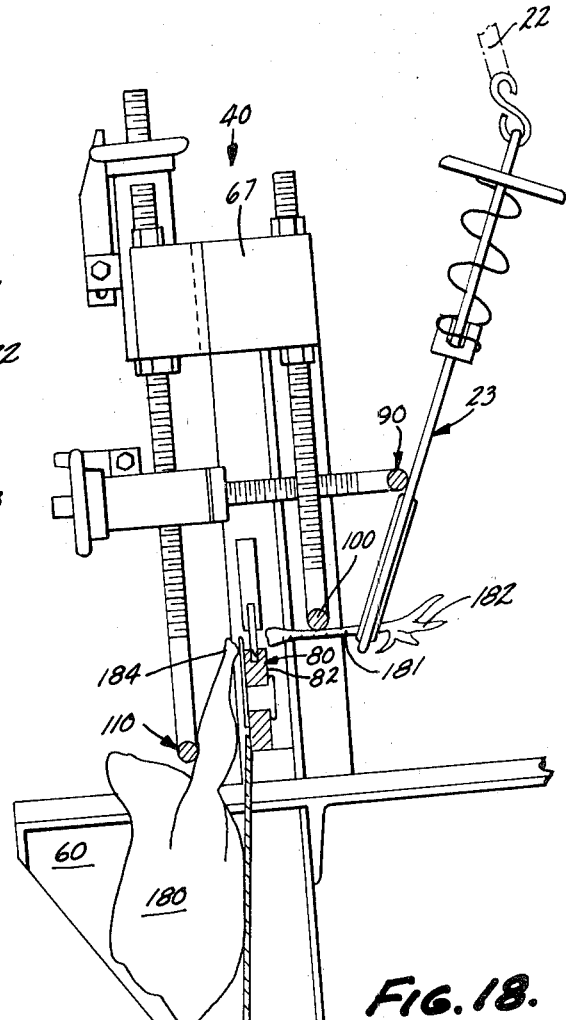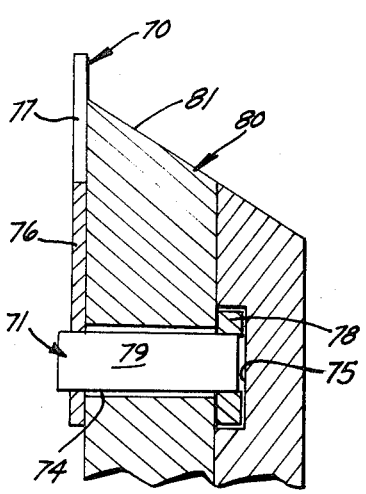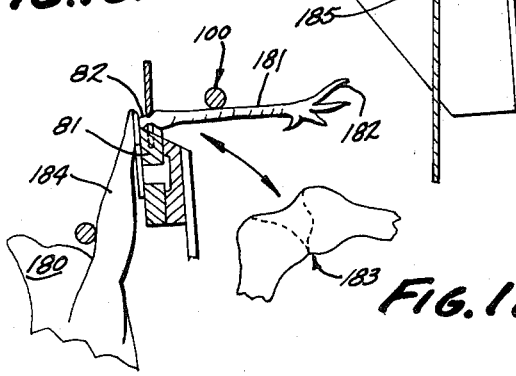

Aug. 4, 1970   E. J. CRANE   3,522,622
HOCK CUTTER

Filed Sept. 22, 1967   5 Sheets-Sheet 5

INVENTOR.
EDWARD J. CRANE
BY
ATTORNEYS

United States Patent Office 3,522,622
Patented Aug. 4, 1970

3,522,622
HOCK CUTTER
Edward J. Crane, Ottumwa, Iowa, assignor to International Agri Systems, Inc., Ottumwa, Iowa, a corporation of Iowa
Continuation-in-part of application Ser. No. 587,035, Oct. 17, 1966. This application Sept. 22, 1967, Ser. No. 669,921
Int. Cl. A22c 21/00
U.S. Cl. 17—11    40 Claims

ABSTRACT OF THE DISCLOSURE

An apparatus particularly adapted for severing the hocks of a bird from the edible portions thereof in assembly line fashion. The birds are suspended by the legs from an overhead conveyor and the depending shackles are lifted and then drawn by means of wheels as the particular bird approaches the severing apparatus. The lifting process causes the bird to clear the forward extremity of a working rail assembly and subsequent to the drawing operation, the bird slides down on the rail in such a manner that the hock joint passes into registry therewith. The bird is moved along the working rail by a drag conveyor integrally incorporated therewith operating in conjunction with the overhead conveyor assembly.

The positioned joint is subjected initially to a blunt hammering force which is operative to separate the bone portions. As the bird proceeds along the rail subsequent to separation of the bone portions, it is contacted by an oscillating knife which, in the preferred embodiment of this invention, forms an integral portion of the blunt separating instrument. The knife section of the oscillating instrument completes severing of the joint.

---

This application is a continuation-in-part of co-pending application Ser. No. 587,035, filed Oct. 17, 1966, and assigned to a common assignee, now abandoned.

BACKGROUND

This invention relates to poultry dressing apparatus and, more particularly, to an apparatus particularly adapted for severing the inedible portions of the bird during an assembly line preparation and packaging operation.

In modern poultry dressing plants, the poultry are carried by an overhead conveying line to the various work stations at which they are defeathered, eviscerated, washed and the like. The poultry are generally shackled by their legs with their heads hanging freely and with the shackle being carried by a chain suspended from the overhead conveyor. At some point in the dressing process, it is necessary, of course, to remove the necks and inedible portions of the legs from the birds. Up until a few years ago, this operation was always accomplished by removing the bird from the shackle, placing it in some type of cutting mechanism and severing the desired members.

This hand operation was both expensive and time consuming and a number of devices were proposed to execute the severing operations without removing the bird from the shackles in which it was carried. Examples of such devices may be seen in U.S. Pat. Nos. 2,846,718; 2,855,-624; and 3,199,143. As is illustrated in each of these patents, two distinct steps are necessary during any assembly line severing process. First, the particular point of desired severance must be positioned relative to the severing mechanism such that the cut will be made at the desired location despite variances in the member length of the various birds being processed. Second, the cut must be made in uniform fashion without unnecessary tearing or breakage of the members which are to be packaged for consumer use. The above noted patents disclose varying combinations of elements for accomplishing these two functions. None of these devices, however, have achieved wide commercial acceptance, primarily because of their failures to properly position the bird for the cutting operations.

OBJECTS AND SPECIFICATION

It is an object of this invention, therefore, to provide a cutting apparatus which is capable of effectively positioning the desired point of severance in separating relationship to the spreading and cutting members.

It is an object of this invention to provide a novel cutting member which cleanly and efficiently severs the poultry carcass at the desired location without tearing or bruising those portions of the bird which are to be packaged for consumer use.

More particularly, it is an object of this invention to provide a novel means for positioning the hock joints of a bird suspended from an overhead conveyor onto a separating surface with the hock positioned such that the processing will be made at the proper location regardless of varying bird dimensions and without manual adjustment of the device.

It is an object of this invention to provide a spreading and cutting member which separates the bones at the hock joint prior to severing the skin, thus avoiding irregular cuts and tears and the consequent monetary loss prompted primarily by grading procedures.

It is another object of this invention to provide a hock cutter of the type described which utilizes the flexible nature of the hock and a means of positioning it in cutting relationship with respect to the knife.

It is an object of this invention to provide a positioning apparatus incoporating means for maintaining the longitudinal displacement of the poultry members even though the positioning process necessitates the dragging of them along a relatively stationary surface by the overhead conveyor.

It is yet another object of this invention to provide an orientation apparatus for use between adjacent processing machines which effectively untangles and reorients the individual shackles prior to their passage through the next processing apparatus.

These and other objects of this invention will be clearly understood by reference to the following specification and accompanying figures in which:

FIG. 2 is a side-elevational view, partially broken away, of the main frame assembly;

FIG. 3 is an end-elevational view of the apparatus;

FIG. 5 is a cross-sectional view of the rail and drag-conveyor assembly;

FIG. 9 is a fragmentary, schematic side-elevational view of the knife and rail assemblies;

FIG. 14 is a cross-sectional view of the knife assembly power-transfer mechanism;

FIG. 15 is a schematic illustration of the operation of the lift wheel assembly;

FIG. 16 is a schematic illustration of the operation of the draw wheel assembly;

FIGS. 17a and 17b are schematic illustrations of a bird in operative relationship with the forward or separating end of the reciprocating knife assembly, FIG. 17b indicating the detail of the hock joint;

FIG. 18 is a cross-sectional view of the apparatus illustrating a bird in operative relationship with respect to the severing extremity of the knife assembly;

FIG. 19 is a schematic plan view of the guide rod and rail assemblies;

FIG. 20 is a schematic illustration of the typical overhead conveyor system for utilization in conjunction with the novel apparatus; and FIG. 21 is a schematic, plan view illustrating a typical positioning of the lift and draw wheels in relationship to the conveyor and rail assemblies.

Briefly, the apparatus which forms the subject of this invention has a base frame assembly within which is positioned the main frame assembly. The apparatus is positioned with respect to the overhead conveyor in such a manner that the birds passing therealong are brought into contact with the main frame assembly. The birds are moved along the main frame assembly for a distance sufficient to permit the positive alignment of the portion to be separated thereacross. This portion is thereafter contacted by a separating and severing apparatus operative to cleanly and evenly sever the bird at the desired point.

Figure 1:
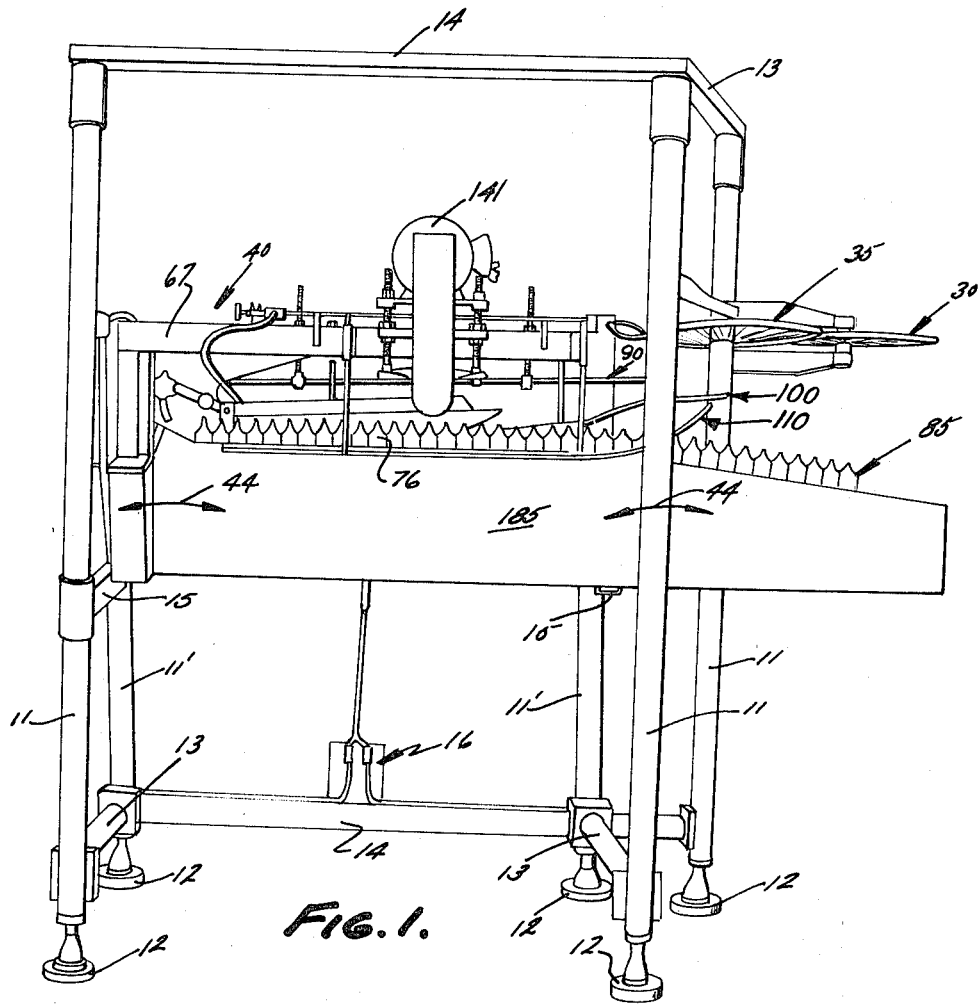
FIG. 1 is a side-elevational perspective view of the apparatus which forms the subject of this invention.

Referring now to the figures, a preferred embodiment of this invention will be described in detail. Referring initially to FIGS. 1 and 3, the apparatus comprises a base frame assembly indicated generally by the reference numeral 10 having a series of upright supports 11 which contact the floor of the particular plant by means of pivotable feet 12. The base frame 10 has a plurality of lateral supports 13 and longitudinal supports 14. Extending inwardly from the two vertical supports 11' which, preferably, are hydraulically expandable, are a pair of vertically shiftable main frame supports 15. A conventional hydraulic pump assembly 16 is provided for selectively expanding and contracting the vertical supports 11' in order to raise and lower the main frame assembly 40 so that it may be brought into suitable operating relationship with respect to the overhead conveyor assembly within the plant.

The overhead conveyor assembly 20 is of conventional fashion as illustrated in FIGS. 15, 16, 18 and 20. It consists of an overhead track indicated generally by the reference numeral 21 having a plurality of flexible chains 22 depending therefrom. Affixed to the lower extremities of the depending chains 22 are a series of shackles 23. Preferably, shackles 23 are of the automatic-release variety so as to permit operation of the installation with minimum labor. Preferably, also, the depending chains 22 are tied together by means of a conventional dog or intermediate stabilizer chain 24 immediately above the shackles, although the necessity of providing this particular stabilizing assembly will depend upon the environment in which the apparatus is to be utilized.

As will be readily understood by those skilled in the art, means are provided at some location within the plant for powering the overhead conveyor assembly 20 within the overhead track 21. The application of such power causes the depending chains 22 and birds affixed thereto by means of shackles 23 to migrate along the conveyor at the desired speed.

Referring now to FIGS. 1, 3, 15, 16 and 21, the lift wheel assembly, indicated generally by the reference numeral 30, comprises a pair of adjustable support brackets 31 extending centrally from one of the vertical uprights. The support brackets 31 are vertically adjustable, preferably, by means such as a sleeve 34 operative to slide up and down the vertical uprights 11 and adapted to be secured in any desired position. Journalled within the support brackets 31 is wheel 32 which, as will become more apparent hereinafter, is operative to deflect the depending chains for supports 22 during passage thereby by abutment with the periphery of the wheel.

Similarly, the draw wheel assembly 35 comprises a pair of support brackets 36 secured in vertically adjustable manner at 39 to the opposite upright 11. The support brackets 36 also carry a rotatably journalled wheel 37 at their inner extremities which is operative to deflect the depending chains for bird supports 22 as they pass thereby.

Referring now specifically to FIGS. 1 through 4, the main frame assembly, indicated generally by the reference numeral 40, is secured to the base frame assembly 10 by means of a pair of support brackets indicated generally by the reference numeral 42. A pivot plate 43 is hingedly affixed to each of the support brackets 42 and the other extremities thereof are affixed to the vertically shiftable main frame supports 15 also in pivotable fashion. This connection permits the main frame assembly 40 to pivot within the base frame assembly 10 in directions indicated generally by the arrows 44 in FIG. 1.

The main frame assembly is biased toward the "upstream" direction of the overhead conveyor by means of the safety switch assembly indicated generally by the reference numeral 50 (see FIG. 2). This assembly comprises an elongated rod 51 slidably journalled within the base frame assembly 40. The rod is held in an outwardly extended position by means of a rather strong compression spring 52 causing it to bear against the reaward pivot plate 43 and, thus, pivot the main frame assembly to the right as shown in FIG. 2 as far as permitted by suitable stops thereon.

The purpose of attaching the main frame assembly 40 to the base frame 10 in the pivotable manner described is to prevent damage to the machine and conveyor in the event that a portion of the conveyor should become entangled with the apparatus. In this event, the overhead conveyor will attempt to pull the entire apparatus along with it. Such an attempt, however, will result in a pivoting of the main frame assembly 40 to the left as viewed in FIG. 2 against the force exerted by compression spring 52 on rod 51. Such pivoting, in turn, will cause rod 51 to recede into the main frame assembly 40.

The right extremity of rod 51 (as viewed in FIG. 2) has a coupling member 53 suitably affixed thereto which carries a slanted actuator cam 54 operatively associated with a microswitch 55 having contacts 56. As the rod recedes into the main frame assembly under the influence of the snarled or tangled overhead conveyor, the cam or slanted actuator 54 moves to the right causing the microswitch contact 56 to deactuate the overhead conveyor and, thus, prevent extensive damage to the installation.

While not illustrated in detail in the drawings, the main frame assembly 40 is preferably mounted within the base frame assembly 10 in such a manner that it may be pivoted with respect thereto in a counterclockwise direction as indicated in FIG. 18 through an arc of 10 or 15 degrees. Such an adjustment may be provided, for example, by slotting the connection of support brackets 42 to the main frame assembly 40. This pivoting permits the main frame assembly to be oriented with respect to the birds being operated upon in such a manner that the bird carcass does not drag excessively along the apparatus during the severing process.

As illustrated best in FIGS. 1 through 4, the base frame assembly 40 comprises a support assembly 60 having an elongated bench-like structure 61 with a level section 62 and a downwardly sloping section 63 at the forward or upstream conveyor-referenced extremity thereof. At the rear extremity of the bench structure 61 is a vertical pillar 66 which has extending therefrom in generally coplanar relationship with the bench structure 61 an overhead support structure 67. A webbing 68 interconnects the pillar 66, bench structure 61 and overhead support 67.

The bench structure 61 has slidably supported along the upper extremity thereof the drag conveyor assembly indicated generally by the reference numeral 70. The drag conveyor consists of (FIG. 5) a conventional roller chain 71 which passes in closed-loop fashion about the idler sprockets 72 and the drive sprocket 73. Suitable means are provided for rotating the drive sprocket. Formed in the upper portion of the elongated bench structure 61 is the drag conveyor guide 74 which runs the entire working length of the bench structure 61. The drag conveyor guide follows, generally, the path of the upper surface of the bench structure 61 and, thus, extends generally horizontally along section 62 thereof and then downwardly along section 63 thereof.

The roller chain 71 has a continuous series of drag links 76 affixed along one side thereof. The drag links 76 have extending finger portions 77 which protrude upwardly above the rail section 80 to be discussed hereinafter. The roller chain is retained in position along the bench section 61 by forming the interior of the drag conveyor guide 74 in such a manner as to overlie the interior link edges 78 as indicated by the reference numeral 75 in FIG. 5. The roller 79 of the chain, therefore, passes through a restricted section of the guide 74 and, thus, the drag conveyor chain 71 must be threaded through the upper portion of the apparatus during assembly thereof.

Figure 6:
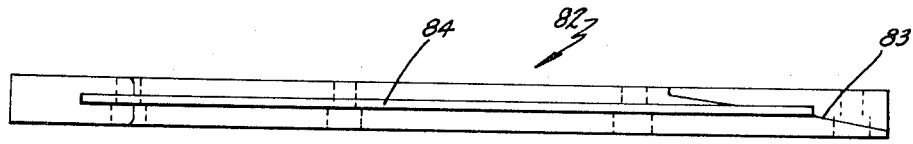
FIG. 6 is a plan view of the rear section of the rail assembly.
Figure 7:
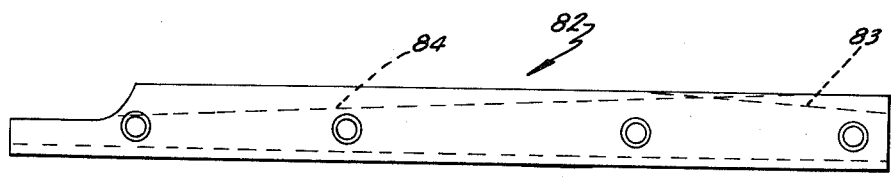
FIG. 7 is a side-elevational view of the rear section of the rail assembly.
Figure 8:
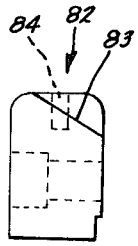
FIG. 8 is an end-elevational view of the rear section of the rail assembly.

Positioned slightly above the drag conveyor guide 74 on the elongated bench structure 61 in such a manner that the extending fingers 77 rise above it is the working rail assembly indicated generally by the reference numeral 80 (see particularly FIGS. 5, 9 and 15 through 18). The assembly 80 has a forward section 81 and a rear section 82. The rear section 82 is shown in FIGS. 6 through 8. The forward section 81 of working rail assembly 80 comprises a slanted surface which slopes sharply away from the edge at approximately a 45 degree angle toward the overhead conveyor or hock side of the machine. This slope is continued as indicated at 83 into the rear section 82 of the rail assembly but changes to a rearwardly declining groove 84 as the rearward extremity of the machine is approached. The longitudinal center of the deepening groove 84 does not coincide with the vertex of the slanted surfaces 81 and 83 but, rather, as shown best in FIG. 8, is positioned slightly toward the hock or overhead conveyor side of the apparatus. In actual practice, it has been found that a spacing of approximately one-eighth of one inch between the center lines of these two components will give satisfactory results.

Figure 4:
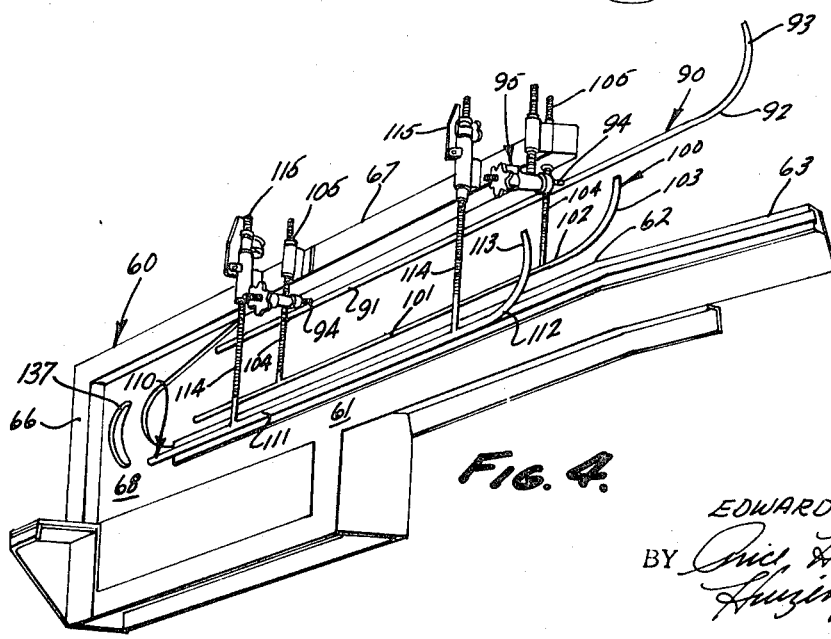
FIG. 4 is a perspective view of the support section, rail section and guide rod sections of the main frame assembly.

Three guide rod assemblies are provided for guiding the bird through the apparatus in such a manner that the hock portion thereof will be properly positioned for the cutting and separating operation. These are shown best in FIGS. 1 through 4 and 19. The upper guide rod assembly, indicated generally by the reference numeral 90, comprises a straight portion 91 positioned on the inward or overhead conveyor side of the main frame assembly. The rod curves away from the overhead conveyor side of the apparatus at the forward extremity thereof as indicated by the reference numerals 92 and 93 (FIG. 4).

The upper guide rod assembly 90 is positioned by menas of a pair of support arms 94 and adjustable support mechanisms 95. Adjustable support mechanisms 95 preferably permit adjustment of the upper guide rod 90 in both lateral and vertical direction.

The middle guide rod assembly indicated by the reference numeral 100 is positioned below and outside of (or toward the overhead-conveyor remote side of the apparatus) the upper guide rod 90. The middle guide rod assembly has a straight portion 101 which also curves upwardly and outwardly toward the forward extremity of the machine as indicated by the reference numerals 102 and 103. It is secured to the support assembly 60 by means of support 104 and vertically adjustable support mechanisms 105 which, in the embodiment shown, may take the form merely of opposed lock nuts.

Similarly, the lower guide rod assembly, indicated generally by the reference numeral 110, comprises a straight portion 111 positioned below the working rail assembly 80 and on the overhead conveyor-remote side thereof. The lower rod assembly 110 also curves upwardly and outwardly at its forward extremity 113 and is supported from a pair of support arms 114 affixed to the frame by means of adjustable support mechanisms 115.

Figure 10:
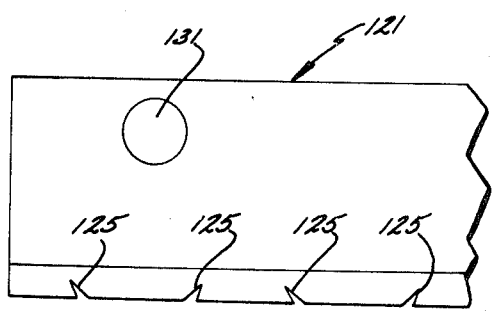
FIG. 10 is an enlarged, fragmentary, side-elevational view of the rear portion of the reciprocating knife.
Figure 11:
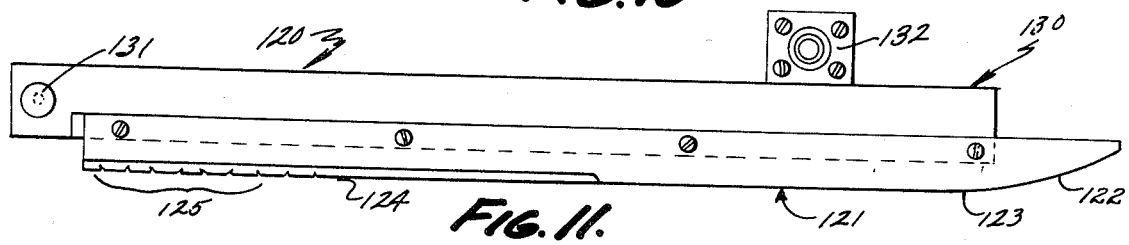
FIG. 11 is a side-elevational view of the knife assembly.

The knife assembly 120, shown best in FIGS. 9 through 11, comprises an elongated blade member 121 having an upwardly curved leading end 122. The forward lower extremity 123 of the blade 121 is rounded in cross section, while the rear portion 124 thereof is sharpened in generally V-shaped fashion. The rear 3 or 4 inches of the sharpened portion 124 contain serrations 125, the purpose of which will become evident hereinafter.

Referring additionally to FIG. 14, the knife is supported by a knife support block 130 to which it is attached by conventional means such as cap screws. The support block 130 has a pivot bearing or similar connection 131 at the rear section thereof and a suitable bearing block structure 132 on the upper side at the forward extremity thereof. As illustrated best in FIG. 2, the knife pivot assembly 135 comprises a clevis 136 tiltable with respect to the webbing 68 by means of a suitable pivot (not shown), a slot 137 in the webbing 68, a locking screw 138 and a vertical adjustment member 139. Mounted at the forward extremity of the clevis 136 in pivotable fashion and in interference-free relationship with respect to the webbing 68 is the knife block 130. This connection, of course, passes through the pivot bearing 131 in the knife block.

Referring additionally to FIG. 1, the knife is powered by means of a suitable motor 141 affixed to the overhead support 67 by means of a suitable mounting bracket 149. Power is transmitted from the motor via belt 150 to a pulley 142 to rotate an eccentric shaft 143 (see FIG. 14). The centered portion 144 of the shaft 143 is journalled to the overhead support 67 of the apparatus by means of suitable bearings 147. The offset portion 145 of the shaft 143 passes through the bearing block 132 on the knife support block 130 such that, when pulley 142 is rotated, the knife moves or reciprocates in eccentric fashion pivoting about its connection with the clevis at bearing 131. Thus, the clevis connection must, as will be readily appreciated by those skilled in the art, make some provision for sliding as well as pivotable movement of the knife block and knife assembly 120 attached thereto. The eccentric shaft 143 incorporates a conventional counter weight 146 as a means of preventing excessive wear on the support bearings 147 and, thus, prolonging the life of the driving mechanism.

A water assembly, indicated generally by the reference numeral 160, is provided for constantly spraying water onto the support rail and guide rods during utilization of the machine. The water thus sprayed lubricates the surfaces against which it impinges to encourage the free sliding of the birds along them. The water system may be extended, if desired, to lubricate the clevis bearing in the knife support clevis 136 as illustrated or, alternatively, some type of sealed bearing may be utilized.

OPERATION

The operation of the apparatus will be described with reference to a hock cutting environment, although, as will be readily appreciated by those skilled in the art, many of the concepts embodied in the apparatus will find equal application in other types of processing environments. The cutting of the hocks from the birds will ordinarily be one of the final steps in their preparation for grading, since they will have been suspended from them during the major portion of their travel through the processing plant.

As the birds approach the apparatus of this invention on the overhead conveyor line, they are initially lifted up and to the left as illustrated schematically in FIG. 15 by the abutment of the overhead conveyor chains 22 with the periphery of lift wheel 32 as a means of insuring that the bird will pass onto the correct side of the rail assembly 80. Such a procedure will usually be necessary because of the desirability of keeping the working portion of the machine to the outside of the vertical plane encompassing the overhead conveyor in order that the propelling force furnished to the bird from this source will be correctly oriented during subsequent parts of the operation.

Once the bird is passed up and around the forward extremity 85 (see FIGS. 1 and 2) of the rail assembly 80, the depending flexible supports 22 are immediately contacted by the draw wheel assembly 35 which, as shown schematically in FIG. 16, draws the leg portion of the bird toward the inside of the machine. The draw wheel assembly 35 is arranged, preferably, such that the hock joint 183 of the bird 180 is pulled completely above and to the inside of the upper surface of the forward section 81 of rail assembly 80 such that, at the maximum draw point, the lower portion of the bird drumstick is actually riding upon the rail 81 (see FIG. 16).

During contact of the particular depending flexible support 22 with the lift and draw wheels, the bird 180, shackle 23 and support 22 have come into operative relationship with the upper, middle and lower guide rod assembly (90, 100 and 110, respectively) which, as illustrated in FIGS. 17 and 18, tend to force the hock joint of the bird into a right-angle configuration insofar as possible. The operation of the guide rods, the rising of the forward section 81 of the working rail assembly 80, and the release of tension from the draw wheel 37, cause the bird to settle with respect to the working rail assembly 80 until such point as the hock joint becomes aligned directly over the rail. This will be true, it should be noted, regardless of the specific dimensions of the particular bird being aligned, if the guide rods have been adjusted correctly for the particular class of birds being operated upon. The pulling of the bird over the working rail assembly 80 further than necessary and subsequently allowing it to settle back down until the hock joint bends provides a means of compensating for the varying bird sizes. As the birds pass into operative relationship with respect to the apparatus from the lift and draw wheels, the outward and upward curvature of the guide rods 90, 100 and 110 insures, inter alia, that the shackle, hock and body section of the particular bird will come into proper alignment with the apparatus. Thus, as illustrated in FIG. 18, the shackle 23 should be on the inside of the upper guide rod 90; the hock 181 should be directly beneath the middle guide rod 100 and held in approximately horizontal position thereby; and the drumstick portion 184 of the bird should be pressed against the shield 185 below the working rail 80 by the lower guide rod 110. As the three guide rods straighten and proper alignment is achieved, the hock joint will assume the position illustrated in FIGS. 17a and 17b.

It should be noted, additionally, from FIG. 18 that the upper guide rod 90 serves as a fulcrum against which the shackle 23 tends to pivot under the influence of the overhead conveyor assembly. Thus, as viewed in FIG. 18, the shackle tends to pivot in counterclockwise fashion about fulcrum 90 and, thus, keeps the hock joints snuggly abutting the vertex of the rail assembly 80.

In addition to swinging the bird to the proper side (the outside) of the apparatus, the lift wheel assembly 30 also functions to keep the bird from dragging behind the overhead conveyor during its initial contact with the apparatus. Shortly after such contact, the leg sections of the bird fall between two of the fingers 77 on the drag conveyor assembly 70 and are thereafter pulled along thereby at a speed identical to that at which the overhead conveyor is traveling. Thus, as viewed in FIGS. 17 and 18, the bird is being propelled from both ends of the leg and, thus, stays in relatively perpendicular position with respect to the elongated working rail assembly 80.

Once initial positioning of the bird has been completed, the joint is contacted by the vertically reciprocating knife assembly 120. Such contact is made, initially, by the blunt, curved, forward section 122 of the knife. Thus, initial contact with the hock joint will consist of only a light tap from the rounded section 123 of the knife because of the relatively large gap existing between the knife and the rail 81. As the drag conveyor 70 and the overhead conveyor 20 pull the bird toward the rear of the machine, however, the level rounded section 123 of the knife comes into contact with the hock joint.

Referring specifically to FIG. 17, the pounding of the hock by the relatively blunt surface of the knife 120 causes a separation of the hock and drumstick bone at the joint and the two parts are maintained affixed to one another thereafter only by the skin and tendons in the joint. Such separation, of course, is a progressive procedure in the sense that the knife edge 123 and rail 81 are constantly converged toward the rear of the machine because of the pivotable nature of the knife hinge at the clevis 136.

Figure 13:
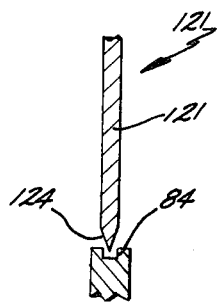
FIG. 13 is a cross-sectional view taken along plane XIII—XIII of FIG. 9.
Figure 12:
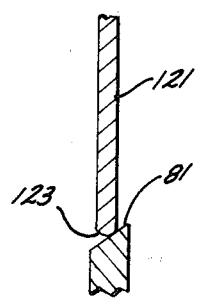
FIG. 12 is a cross-sectional view taken along plane XII—XII of FIG. 9.

As the bird is moved progressively rearwardly by the drag conveyor and overhead conveyor, it comes into contact with the sharpened or V-shaped section 124 of the knife 121. As shown in FIGS. 13 and 18, the remaining skin and tendon portion connecting the hock joint is severed by the V-shaped blade portion forcing the skin into the groove 84 in the rear section 82 of the working rail assembly 80. In the event that the knife is somewhat dull and complete cutting is not achieved at the forward section of the V-shaped section 124 of knife 120, final cutting will be achieved by the serrations 125 at the rearmost section of the blade. At this point, the bird drops from the apparatus and may be carried by a conveyor or like apparatus.

The reciprocating or pounding nature of the knife action causes some wear, of course, to both the knife and particularly the rear section 82 of the working rail assembly 80. A great deal of wear can be compensated for by merely lowering the clevis 136 via the adjustments 138 and 139 to bring the rearward section of the knife closer to the rail. It is possible, additionally, to replace the most wear-prone section 82 of the working rail assembly 80, since it is formed separately from the remainder of the positioning and separating rails.

While a preferred embodiment of this invention has been illustrated in detail, it will be readily apparent to those skilled in the art that other embodiments may be conceived and fabricated without departing from the spirit of this specification and the accompanying drawings.

I claim:

1. In an apparatus for processing birds having an overhead conveyor means and a relatively narrow elongated surface over which it is desired to position the hock of the bird, a positioning apparatus comprising:
    means for suspending the bird by the legs from said conveyor; and
    means for drawing said legs over said surface to a point beyond hock registry with said surface and thereafter permitting the bird to settle until said hock comes into registry therewith.

2. The apparatus as set forth in claim 1 wherein the upstream end of said surface is spaced from the vertical plane of said overhead conveyor means and which further comprises means for deflecting said bird so as to cause it to clear said end.

3. The apparatus as set forth in claim 1 wherein said surface is slanted with respect to the horizontal and converges to an elongated edge along the side opposite from the side toward which said bird is drawn by said drawing means.

4. The apparatus as set forth in claim 3 which further comprises drag conveyor means adjacent said elongated edge, said drag conveyor means being adapted to engage said legs and assist said overhead conveyor means in moving said bird along said surface.

5. The apparatus as set forth in claim 4 which further comprises a plurality of guide means for folding the legs of said bird over said elongated edge as said hock joint comes into registry with said surface.

6. The apparatus as set forth in claim 5 wherein said guide means comprises a series of three elongated guide rods, the first of said rods being positioned above and on the side of said surface toward which said bird is drawn by said drawing means; the second of said rods being positioned with its underside generally level with said surface and on the side of said surface from which said bird is drawn toward by said drawing means; the third of said rods being positioned below and on the side of said surface opposite from that which said bird is drawn toward by said drawing means.

7. The apparatus as set forth in claim 6 which further comprises means positioned along said elongated surface for severing the hock joints of said birds.

8. The apparatus as set forth in claim 5 wherein that section of said elongated surface beneath said drawing means is inclined upwardly.

9. The apparatus as set forth in claim 1 which further comprises a plurality of guide means for folding the legs of said bird at an angle as said hock joint comes into registry with said surface.

10. The apparatus as set forth in claim 9 wherein said guide means comprises a series of elongated rods curving at their upstream extremities away from the vertical plane of said overhead conveyor means.

11. The apparatus as set forth in claim 9 wherein said guide means comprises a series of three elongated guide rods, the first of said rods being positioned above and on the side of said surface toward which said bird is drawn by said drawing means; the second of said rods being positioned with its underside generally level with said surface and on the side of said surface from which said bird is drawn toward by said drawing means; the third of said rods being positioned below and on the side of said surface opposite from that which said bird is drawn toward by said drawing means.

12. The apparatus as set forth in claim 11 wherein said first guide rod is positioned further away from said surface than is said second guide rod as well as above it.

13. The apparatus as set forth in claim 12 wherein said surface is slanted with respect to the horizontal converging to an elongated edge on the side thereof adjacent said third guide rod.

14. The apparatus as set forth in claim 1 which further comprises drag conveyor means adjacent said surface, said drag conveyor means being adapted to engage said legs and assist said overhead conveyor means in moving said bird along said surface, said drag conveyor means moving at approximately the same lineal speed as said overhead conveyor means whereby said birds will not drag behind said overhead conveyor means as a result of its frictional contact with said surface.

15. The apparatus as set forth in claim 14 wherein said drag conveyor means comprises a plurality of finger like members extending above said surface and movable therealong and on the side thereof opposite from the direction in which said bird is drawn by said drawing means.

16. The apparatus as set forth in claim 1 which further comprises means positioned along said elongated surface for severing the hock joints of said birds.

17. The apparatus as set forth in claim 16 wherein said severing means comprises:
a hock separating member mounted for movement into and out of abutting relationship with said elongated surface; and
means for moving said separating member into and out of said abutting relationship.

18. The apparatus as set forth in claim 17 wherein the upstream leading section of said separating member and that section of said elongated surface against which it abuts are relatively blunt whereby the hock joint of birds passing therethrough will be wedged apart at the bone joint but the connecting skin and tissue not necessarily severed.

19. The apparatus as set forth in claim 18 wherein the downstream section of said separating member is sharpened and wherein that section of said elongated surface against which it abuts has a mating groove therein.

20. The apparatus as set forth in claim 19 wherein said groove deepens progressively as it proceeds toward the rear, downstream extremity of said surface.

21. The apparatus as set forth in claim 19 wherein said surface is slanted with respect to the horizontal and converges to an elongated edge on the side thereof most remote from the direction in which said bird is drawn by said drawing means.

22. The apparatus as set forth in claim 20 wherein said downstream section of said separating member is serrated.

23. The apparatus as set forth in claim 22 wherein the upstream leading end of said separating member curves upwardly.

24. Apparatus for separating portions of a bird comprising:
an elongated surface;
separating means mounted for movement into and out of adjacent relationship with respect to said surface, said means including relatively blunt means for first hammering at the joint between the portions to be separated so as to wedge apart the bones within said portions and relatively sharp means for thereafter cutting said joint when the desired point of separation on said bird is placed between said surface and said separating means.

25. The apparatus as set forth in claim 24 which further comprises means for moving the desired point of separation on said bird along said surface such that it is initially contacted by said blunt hammering means and then by said sharp cutting means of said separating means.

26. The apparatus as set forth in claim 25 wherein said separating means comprises a continuous elongated member.

27. The apparatus as set forth in claim 25 wherein the desired point of separation on said bird is the hock joint and which further comprises means for folding the leg of said bird over said surface with said hock joint adjacent the edge thereof.

28. The apparatus as set forth in claim 27 wherein said folding means comprises at least two elongated rods positioned adjacent said surface.

29. The apparatus as set forth in claim 28 wherein said moving means comprises an overhead conveyor attached to the hock of said bird and adapted to pull it along said surface and a drag conveyor mounted adjacent said surface on the side thereof opposite from that along which the force from said overhead conveyor is exerted, said drag conveyor and said overhead conveyor running at approximately identical lineal speeds.

30. The apparatus as set forth in claim 24 wherein that portion of said surface lying in moveable adjacency with said blunt hammering means is slanted with respect to the plane of movement of said blunt section.

31. The apparatus as set forth in claim 24 wherein said separating means comprises a continuous elongated member pivotably and slideably connected with respect to said surface and which further comprises off-center hub means for eccentrically rotating said elongated member with respect to said surface whereby said member walks toward, along and away from said surface sequentially.

32. The apparatus as set forth in claim 25 wherein the upstream leading end of said blunt hammering means curves upwardly.

33. Apparatus for separating the legs of birds at the hock joint comprising:
   means for positioning said joint over a relatively narrow surface;
   means for moving said joint of each of said legs along said surface;
   a reciprocable one-piece separator moveable into and out of adjacency with said surface; and
   means for reciprocatingly contacting each said joint with said separator by different portions of said separator successively as said joint is moved along said surface until such time as said joint is separated.

34. The apparatus as set forth in claim 33 which further comprises means for folding the legs of said birds over said surface during positioning thereof.

35. The apparatus as set forth in claim 33, wherein said positioning means includes means for folding and confining the legs of birds over said surface such that said hock joints overlie one edge of said surface during the entire separating operation;
   said one edge being bounded by said surface and its adjacent side so as to form an acute angle.

36. The apparatus as set forth in claim 35 wherein said folding means comprises guide means for positioning the hock of said bird across said surface so that said joint forms an approximate perpendicular angle, the remainder of said bird hanging downwardly.

37. The apparatus as set forth in claim 35 wherein said acute angle is approximately 45 degrees.

38. The apparatus as set forth in claim 35 wherein said surface is positioned at an angle with respect to the horizontal.

39. A method of separating the inedible leg sections of poultry from the edible sections thereof at the hock joint comprising the steps of:
   positioning said hock joint over a relatively narrow, elongated working surface;
   moving opposite sections of said leg adjacent said hock joint in such a direction as to fold said leg over said surface, said fold being at said hock joint;
   reciprocatingly contacting said joint with a single instrument to effect separation therein while being so moved.

40. The method as set forth in claim 39 wherein said step of reciprocatingly contacting includes the steps of:
   hammering said folded leg at the hock joint so as to separate the bones at said joint; and
   cutting said hock joint subsequent to the bone separation to complete the severing operation.

References Cited

UNITED STATES PATENTS

| | | | |
|---|---|---|---|
| 3,229,327 | 1/1966 | Brooks | 17—11 |
| 3,233,280 | 2/1966 | Loftus | 17—11 |
| 2,846,718 | 8/1958 | Sengelaub et al. | 17—11 |
| 2,855,624 | 10/1958 | Jerome et al. | 17—11 |
| 3,038,197 | 6/1962 | Turner | 17—11 |
| 3,137,892 | 6/1964 | Best et al. | 17—11 |
| 3,199,143 | 8/1965 | Ousley et al. | 17—11 |
| 3,323,164 | 6/1967 | Bonuchi et al. | 17—11 |
| 3,364,515 | 1/1968 | Brown et al. | 17—11 |

LUCIE H. LAUDENSLAGER, Primary Examiner

U.S. Cl. X.R.

17—12, 52

PO-1050
(5/69)

UNITED STATES PATENT OFFICE
CERTIFICATE OF CORRECTION

Patent No. 3,522,622      Dated August 4, 1970

Inventor(s) E. J. Crane

It is certified that error appears in the above-identified patent and that said Letters Patent are hereby corrected as shown below:

Column 11, line 4;

"movement of said blunt section." should be --- movement of said blunt hammering means. ---;

Column 12;

After line 13 insert --- moving said leg along said surface; and ---.

SIGNED AND
SEALED
NOV 24 1970

(SEAL)
Attest:

Edward M. Fletcher, Jr.
Attesting Officer

WILLIAM E. SCHUYLER, JR.
Commissioner of Patents